United States Patent [19]

Clementoni et al.

[11] 4,283,231

[45] Aug. 11, 1981

[54] SULFUR-TREATED PROPANE-PRECIPITATED ASPHALT

[75] Inventors: Dominick Clementoni, Union; Luke W. Corbett, Mountainside, both of N.J.

[73] Assignee: Exxon Research & Engineering Company, Florham Park, N.J.

[21] Appl. No.: 111,036

[22] Filed: Jan. 10, 1980

[51] Int. Cl.³ .............................................. C08L 95/00
[52] U.S. Cl. ................................... 106/274; 106/278; 106/281 R; 208/44; 427/138
[58] Field of Search .................... 106/274, 278, 281 R; 208/44; 427/138

[56] References Cited

U.S. PATENT DOCUMENTS

| 3,317,447 | 5/1967 | Black et al. |
|---|---|---|
| 3,793,189 | 2/1974 | Corbett. |
| 3,960,585 | 5/1976 | Gaw .................................. 106/274 |

FOREIGN PATENT DOCUMENTS

| 1380095 | 1/1964 | France ..................................... 106/274 |
|---|---|---|
| 610629 | 10/1948 | United Kingdom. |
| 956313 | 4/1964 | United Kingdom. |

OTHER PUBLICATIONS

Hydrocarbon Processing, vol. 58, pp. 173-174, 4/1979.
"Distribution & Reactions of Sulfur in Asphalt During Air Blowing & Sulfurizing Process," I & EC Product Research & Development, vol. 4, No. 1, pp. 51-57, 3/1965.
"Viscosity Characterization of Asphalt Cement," L. W. Corbett & H. E. Schweger, ASTM, pp. 40-49, 1973.

Primary Examiner—Lorenzo B. Hayes
Assistant Examiner—Amelia B. Yarbrough
Attorney, Agent, or Firm—Robert J. North

[57] ABSTRACT

Propane-precipitated asphalt is heated with 1-15 wt. % elemental sulfur at 140° to 300° C. until hydrogen sulfide evolution ceases. The sulfur-treated asphalt base material having an increased softening point of about 65°-300° C., is blended with 5-60 wt. % liquid petroleum fraction, such as vacuum gas oil or extract oil, having an equivalent atmospheric boiling point of 370°-500° C., to yield a quality paving grade asphalt cement composition meeting ASTM standards.

17 Claims, 1 Drawing Figure

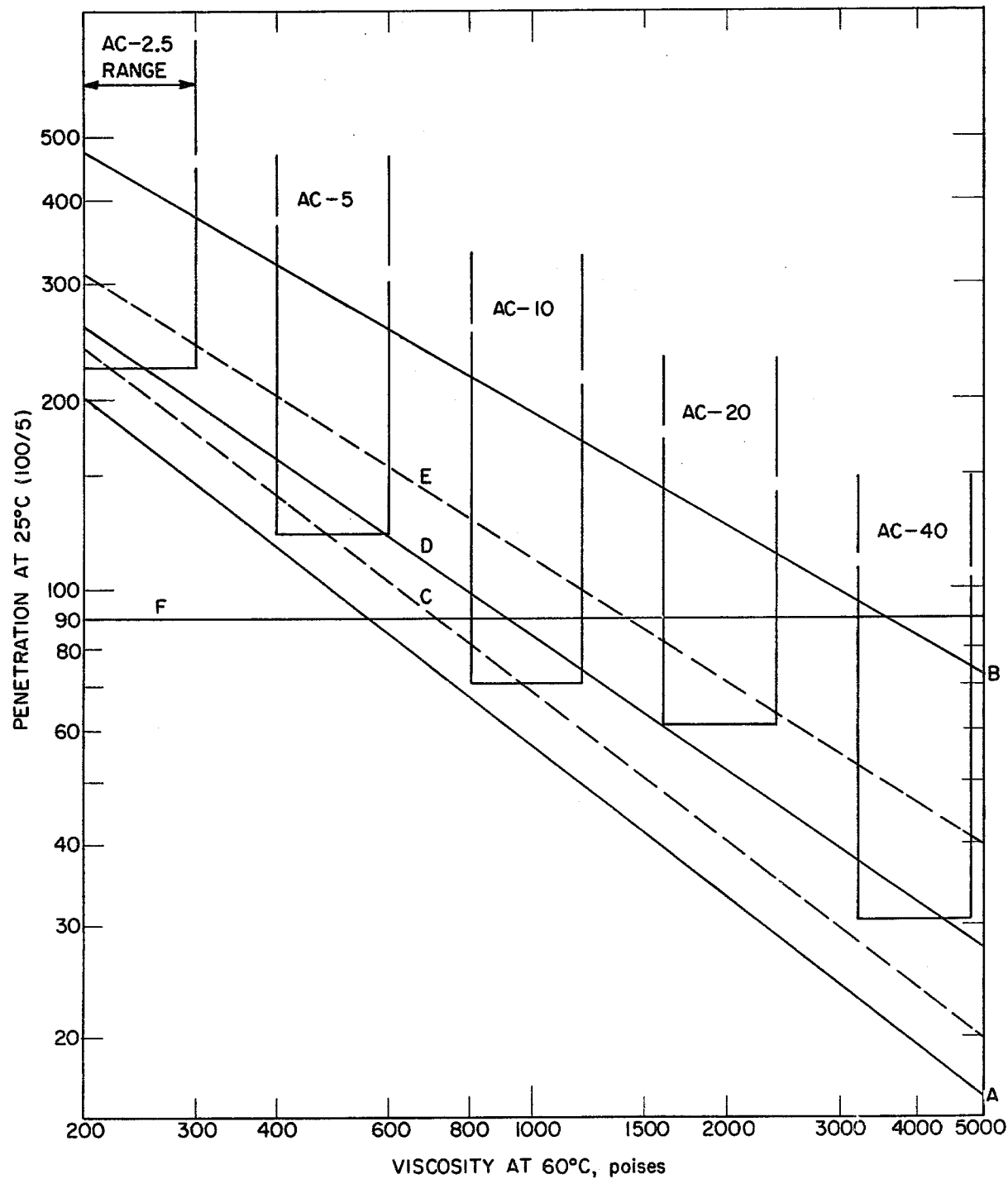

SULFUR-TREATED PROPANE-PRECIPITATED ASPHALT

BACKGROUND OF THE INVENTION

1. Field of the Invention

This invention relates to a quality paving asphalt cement composition, a process for its manufacture, and its use in paving operations. The composition is manufactured by treating propane-precipitated asphalt (PPA), also termed "propane deasphalting unit fraction" (PDU), with elemental sulfur at a temperature of about 140° to 300° C. until the evolution of hydrogen sulfide ceases. The resulting sulfur-treated asphalt base is blended with a liquid petroleum fraction, having an atmospheric equivalent boiling range of about 370° to 500° C., e.g., vacuum gas oil or an extract oil, producing an asphalt cement composition having improved temperature susceptibility and ductility characteristics and meeting ASTM standards.

2. Description of the Prior Art

Asphalt formulations comonly termed "asphalt," or "bitumen," which are used in road paving operations are blends of an "asphalt cement," i.e., a binder material, and inorganic mineral aggregate, such as stone, sand and/or mineral filler.

Asphalt cement prepared from heavy crude oil is normally a "straight run residuum, " being the residue produced after distilling off volatile petroleum fractions from the asphalt-bearing crude oil. Normally, this residuum is a liquid which can be "run" out of the distillation process at elevated temperatures and, after adjustment for consistency, is suitable for directly manufacturing asphalt cement formulations.

However, it is often necessary to adjust the composition of the residuum in order to meet strict paving grade asphalt specifications. This is particularly true of asphalts prepared from light crudes having relatively high API gravities, such as Arabian Light which is a large source of asphalt-bearing crude oil. Normally, API gravities (measured at 15.5° C.) for medium and heavy crudes is in the vicinity of 20° and lower, whereas for light crudes, including Arabian Light, the gravities are about 30° and higher. A residuum from these light crudes is always marginal for asphalt manufacture because it is not directly obtainable as a "straight run residumm" for producing acceptable paving grade asphalt cements, for example, ASTM paving grades AC-2½, AC-5, AC-10, AC-20, and AC-40, particularly AC-10 and AC-20, which meet the rigid specifications of ASTM D 3381-76, specifically Table 2, or AASHTO M 226-73, specifically Table II. Paving grades meeting these specifications possess excellent temperature susceptibility and ductility properties as required, for example, in the United States and Australia.

By the term, "temperature susceptibility," as used herein, is meant the susceptibility of an asphalt cement to variations in viscosity or penetration (ASTM D-5) with temperature, wherein low levels of temperature susceptibility lead to excellent rheological and flow characteristics of the asphalt. The term, "viscosity," is well-known and is the ratio between the applied shear stress and rate of shear and is thus, a measure of the resistance to flow of the liquid. Te term, "penetration," is well-known and is the consistency of a bituminous material expressed as the distance in tenths of a millimeter that a standard needle vertically penetrates a sample of the material under known conditions of loading, time, and temperature. The term, "ductility,"is well-known and is a measure of the elasticity of the asphalt cement, as determined by ASTM D 113-79. High ductility leads to improved resistance to cracking and disbonding. Thus, an acceptable asphalt material should have a low level of temperature susceptibility and high ductility.

A further factor in light of the current energy shortage is that the use of a straight run residuum is being discouraged since the residuum still contains considerable amounts of lubricating oil fractions which are often more valuable in other applications than in asphalt paving formulations. Consequently, liquid oil fractions are additionally solvent-extracted from the residuum, following distillation, to maximize lubricating oil and fuel product yields.

One process in the art that is currently used is the treatment of a residuum with propane to extract heavy gas oil fractions yielding a liquid propane-extracted oil fraction and a solid propane-precipitated asphalt, termed "PPA." The propane-extracted oil fraction can then further be extracted with furfural or phenol, for example, to yield a raffinate suitable for making lube oils. The remaining liquid material, after removal of solvent, is an extract fraction called "extract oil." The extract oil can be blended, i.e., "fluxed" with the solid PPA obtained from the propane treatment, to form an asphalt cement composition with improved temperature susceptibility and ductility characteristics. These characteristics can be further improved by subjecting the PPA to "air-blowing," i.e., treating the mixture with an air stream at about 250° to 300° C. for a period of time to increase the softening point and temperature susceptibility of the material. However, this "air-blown" material, sometimes termed "semi-blown" material, prepared from a PPA derived from a light residuum, and fluxed with straight extract oil, is still marginal with respect to meeting temperature susceptibility and ductility requirements of ASTM D 3381-76 and AASHTO M 226-73. What is desired is a process which will further improve these properties toward meeting specifications.

Currently, there are paving formulations being used whch incorporate elemental sulfur as a dispersion to improve its temperature susceptibility characteristics. However, a contractor who buys the base and mixes it with mineral aggregate, prior to use, must heat the material in large quantities to achieve a workable consistency, thus periodically generating sulfurous fumes. What is desired is an asphalt base or cement formulation having improved temperature susceptibility and ductility characteristics which does not emit noxious or toxic sulfur-containing fumes upon mixing with mineral aggregate or application to road surfaces.

Sulfur-treating of bituminous material is known in the art. For example, sulfur-treating of propane-precipitated asphalt (PPA) to improve the blending properties of the asphalt in bitumens is known and is described in British Patent No. 956,313. The patent describes heating PPA with 2-20 weight percent elemental sulfur at 130° to 300° C. for 2 to 10 hours to increase the asphaltene content and reduce the wax content of the material. However, no specific mention is made of the combined steps of completely reacting the PPA derived from a residuum from a light crude with sulfur, and blending the resulting base material with an extract oil to obtain an asphalt cement composition capable of meeting specifications.

British Patent No. 610,629 describes the production of improved bituminous asphalt material in which a mixture of an asphalt, an unsaturated vegetable oil, e.g., linseed oil, and sulfur is heated at about 175° to 180° C. until a smooth, homogeneous bubble-free molten mass is obtained. The resulting material is described as exhibiting good thermal stability, and good susceptibility to plastic flow. However, the process requires the presence and added expense of an unsaturated vegetable oil for obtaining good rheological properties.

U.S. Pat. No. 3,317,447 (1967) discloses a process for treating asphaltenes (a minor fraction of asphalt) derived from crude oil residua. The asphaltenes are heated with an alpha olefin polymer in the presence of elemental sulfur at about 150° to 540° C. to yield a reaction product having a melting point in the range of about 130° to 315° C. The reference states that asphaltic compositions produced by heating asphaltenes with sulfur alone are inferior compositions for many applications.

What is desired is a convenient and inexpensive process for preparing asphalt cement compositions having excellent temperature susceptibility and ductility characteristics, from a propane-precipitated asphalt, which does not require treating the material with unsaturated vegetable oils or organic polymers. Particularly what is desired is a process for converting propane-precipitated asphalt, derived from a light crude oil, into a high quality asphalt cement composition of ASTM grades AC-2½, AC-5, AC-10, AC-20 and AC-40, which meet the specifications of ASTM D 3381-76 (Table 2) or AASHTO M 226-73 (Table II).

SUMMARY OF THE INVENTION

We have unexpectedly found that asphalt cement compositions of ASTM paving grade quality can be produced by heating a mixture consisting essentially of propane-precipitated asphalt, derived from a residuum of a crude oil, and elemental sulfur at 140° C. or above, until hydrogen sulfide evolution ceases and blending the resulting asphalt base material with a liquid petroleum fraction having an atmospheric equivalent boiling range of about 370° to 500° C., such as an extract oil or vacuum gas oil, thereby producing an asphalt cement composition having improved temperature susceptibility and ductility characteristics, which meet ASTM grade and specifications. Optionally, the liquid petroleum fraction can be present in the mixtures of propane-precipitated asphalt and sulfur during the heating step.

Preferred embodiments are where the propane-precipitated asphalt is derived from a residuum of a light Arabian crude oil and the resulting asphalt cement composition being of grade AC-10 or AC-20, and meeting the specifications of ASTM D 3381-76, Table 2, or AASHTO M 226-73, Table II.

In accordance with this invention there is provided a process for preparing an asphalt cement composition comprising the steps of:

(a) heating a mixture consisting essentially of a propane-precipitated asphalt, derived from a residuum of a crude oil having a gravity of above about 20° API, and 0–60 weight percent, based on the total weight of said asphalt, of a liquid petroleum fraction, having an atmospheric equivalent boiling range of about 370° to 500° C., and about 1 to 15 weight percent elemental sulfur, based on the total weight of said asphalt, at a temperature in the range of about 140° to 300° C., until hydrogen sulfide evolution ceases, thereby resulting in a sulfur-treated asphalt base having an increased softening point, compared to that of said propane-precipitated asphalt, and being in the temperature range of about 65° to 300° C. as measured by ASTM D 36-76; and (b) blending said sulfur-treated asphalt base with about 0 to 60 weight percent, based on the total weight of said asphalt base, of said liquid petroleum fraction, such that the total amount of said petroleum fraction present is about 5 to 60 weight percent of said asphalt base, thereby producing an asphalt cement composition being of ASTM viscosity grade AC-2½, AC-5, AC-10, AC-20 or AC-40 and meeting the requirements of ASTM D 3381-76 or AASHTO M 226-73, and exhibiting a higher viscosity at 60° C. (ASTM D 2171-66), as measured by the procedure of ASTM STP 532 (1973), in which said viscosity is interpolated at a penetration level of 90 decimillimeters at 25° C., than a comparative non-sulfur treated composition, derived from the same propane-precipitated asphalt, whose softening point has not been increased.

Further provided is an asphalt cement composition produced by the above-described process.

In addition, there is provided a process for paving a road surface comprising the step of applying to said surface a paving grade quality asphalt cement composition prepared by the above-described process.

BRIEF DESCRIPTION OF THE DRAWING

The FIGURE is a log-log plot of penetration (25° C.) as the ordinate versus viscosity (60° C.) as the abscissa for various asphalt cement compositions. Compositions which are contained in each "box," e.g., AC-20, satisfy ASTM grade requirements for that particular viscosity range, and temperature susceptibility requirements of ASTM D 3381-76 or AASHTO M 226-73.

DESCRIPTION OF THE INVENTION AND PREFERRED EMBODIMENTS

It is known in the art that the temperature susceptibility and ductility characteristics of an asphalt composition are a function of the penetration-viscosity relationships of the material. In general, it is known that the higher the viscosity of a material at a given penetration level, the better the temperature-susceptibility and ductility characteristics. Thus, the viscosity of two different asphalt cement compositions should be determined and compared at the same penetration level to determine which better conforms to specification. This is difficult to do in practice since the amounts of ingredients, i.e., asphalt base and extract oil, to yield a given penetration value cannot be readily predicted and a number of samples must be prepared. However, the reference "Viscosity Characterization of Asphalt Cement," ASTM STP 532, American Society for Testing Material, 1973, Pages 40–49, by L. W. Corbett, a co-inventor herein, and H. E. Schweyer, said reference hereby incorporated by reference, describes a general procedure by which two different asphalt cements, derived from different crude sources, can be directly compared by using only a small number of samples. The authors prepared a series of asphalt cements derived from a single residuum source, in which each sample in the series contained different amounts of contiguous oil fractions. The viscosity at 60° C. of each sample was measured, according to ASTM D 2171-66 by vacuum capillary viscometry, and the penetration at 25° C. of each sample was measured according to ASTM D 5-73. The authors found that when the data were plotted on a log-log scale with the penetration as the ordinate and viscosity as the abscissa, a straight line resulted after least-squares regression treatment, obeying the relation:

$$\log (P/P_1) = M \log (V/V_1)$$

where:
P=penetration at 25° C. in decimillimeters;
V=viscosity at 60° C. in poises, corresponding to P;
$P_1$=penetration at 25° C. at another level;
$V_1$=viscosity at 60° C., corresponding to $P_1$;
M=slope of the log-log plot.

Preparing a log-log plot for two or more comparative asphalt cement compositions is accomplished in the manner described above, using at least two reliable data points for each sample. Thus the viscosities of the samples at 60° C., interpolated at the 90 (decimillimeter) penetration level at 25° C. can be directly compared, by the procedure of ASTM STP 532 (1973), described above. In general, the high the interpolated viscosity at the 90 penetration (25° C.) level, the better the rheological properties of the asphalt. This has been found to be true for sulfur-treated PPA derived asphalt cement, prepared by the instant invention process, as compared to a comparative nonsulfur-treated composition derived from the same PPA, whose softening point has not been increased.

The FIGURE illustrates representative straight line relationships obtained by use of the method described above, in which the respective slope values are not identical, and the lines A and B represent the extreme limits between which all asphalt compositions (from world-wide crude sources) will lie when plotting penetration versus viscosity at the given temperatures. The "boxes," marked AC-2½, AC-5, AC-10, AC-20 and AC-40, being viscosity-penetration ranges, are the ASTM viscosity grade ranges, within which a composition must be to be "in grade," from a viscosity standpoint, and also to be in "specification," as determined by the penetration level, from a temperature susceptibility standpoint, thus meeting the requirements of ASTM D 3381-76 or AASHTO M 226-73. The obtained straight line relationship typifies the behavior of one asphalt base in different degrees of blending with extract oil to yield desired viscosity ranges as plotted against the respective penetration levels. A given blend will yield AC-40 grade and other blends containing a higher percentage of extract oil yield AC-20 and lower viscosity grades. Line C typifies the behavior of an asphalt base prepared from a typical light crude oil in which it is seen that grade or specifications are only marginally met. Line D represents the minimum behavior of sulfur-treated asphalt compositions of this invention. Line E represents preferred compositions of this invention wherein one sulfur-treated asphalt base can produce each grade in specification. Line F represents the 90 decimillimeter penetration level along which compositions of the invention are compared to non-sulfur treated compositions, in which the softening point of the PPA has not been increased.

The object of the present invention process is to produce asphalt cement compositions which are "in grade," and meet the specifications as promulgated by ASTM D 3381-76, and particularly Table 2 requirements, which are partially listed below.

| Grade | Minimum Penetration Level @ 25° C. (100/5) | Viscosity @ 60° C. Poises |
|---|---|---|
| AC-2½ | 220 | 200–300 |
| AC-5 | 140 | 400–600 |
| AC-10 | 80 | 800–1200 |
| AC-20 | 60 | 1600–2400 |
| AC-40 | 40 | 3200–4800 |

For example, grade AC-10 asphalt cement must possess a minimum penetration (25° C.) level of 80, and a viscosity at 60° C. of 800–1200 poises, thus defining box "AC-10", in the FIGURE.

The most important grades are AC-10 and AC-20, being currently used in the United States. AC-10 is normally used in slightly colder climatic conditions and AC-20 in warmer climatic conditions. The invention process described herein produces all five "grades" of asphalt cements.

To be commercially viable, an asphalt cement must not only be "in grade," it must meet specifications relating to temperature susceptibility promulgated by the transportation agencies in different states or countries, such as ASTM D 3381-76, particularly Table 2 above or AASHTO M 226-73, particularly Table II, which are generally equivalent, in the United States. In addition, New South Wales, Australia, has promulgated a specification requiring a penetration value (25° C.) of 85–100 (decimillimeters), and a viscosity @70° C. of 400 centistokes or more. However, the U.S. and Australian specifications are comparable and thus grades AC-10 or AC-20 which meet the U.S. specifications should also meet those of Australia. These tests are hereby incorporated by reference, and involve total evaluation of "graded samples" including penetration value, viscosity at 60° C. and 135° C., flash point, solubility in trichloroethylene, thin-film oven tests, ductility and the like. The instant invention process produces all of the above-described "grades" which satisfy the ASTM, AASHTO and New South Wales, Australia, requirements referred to above.

The invention process is directed to preparing asphalt cement compositions, of paving grade quality, derived from propane-precipitated asphalt, which in turn is derived from a residuum of a crude oil, having a gravity of above about 20° API. Processes for treating a residuum with propane to obtain PPA are well known in the art and these conventional techniques for this purpose may be employed in the present process. PPA useful in the present invention can be prepared from a variety of residua and preferably residua derived from a light middle eastern crude, such as Arabian Light. The gravity of the crude oil can be above 20° API, and it is preferred to conduct the process with lighter crudes, having a gravity about 30° API, and particularly preferred in the range of about 30°–40° API.

PPA derived from a residuum, useful in the instant invention process is generally a semi-solid black material, having a softening point of about 60°–80° C.

The PPA can be used, as is, from the propane-precipitation step or can be optionally further treated, prior to the sulfur-treating step by "air-blowing." By the term, "air-blowing," is meant passing a stream of air through a mass of molten PPa for a period of time, generally about 2–4 hours, which results in an increase in its softening point. Temperatures employed for this process are above the softening point of the PPA and are generally in the range of about 200° to 300° C.

The invention process can be conducted by: (a) heating a mixture of PPA and sulfur and blending the resulting asphalt base with 5-60 wt.% petroleum fraction based on the asphalt base; (b) heating a mixture of PPA, sulfur and total amount of petroleum fraction to be used i.e. 5-60 wt.% of said PPA; or (c) heating a mixture of PPA, sulfur and partial amount of petroleum fraction to be used, and then blending the resulting asphalt base with the remainder of the total amount of petroleum fraction. The amount of petroleum fraction used in step (a) is 0-60 wt.%, based on the weight of PPA and in step (b) is 0-60 wt%, based on the weight of the resulting sulfur-treated asphalt based, such that the total amount of petroleum fraction used is 5-60 wt.% of said resulting asphalt base. Further embodiments include the use of "air-blown" PPA and "sulfur-treated" petroleum fraction in the above embodiments of the subject process. By the term "consisting essentially of" is meant that the mixture of PPA and sulfur contains no other materials in significant quantity, such as organic monomer, polymer, or unsaturated vegetable oil, except for the "liquid petroleum fraction" to be used as a blending agent.

In one embodiment of the process, step (a) comprises heating a mixture consisting essentially of PPA and elemental sulfur, no added petroleum fraction being present, at a temperature in the range of about 140° to 100° C. until the evolution of hydrogen sulfide ceases. This is conducted by forming an intimate mix of the PPA and sulfur such that the sulfur is well distributed throughout the mixture. The materials can be mixed or blended in any suitable apparatus for this purpose, such as a heater-stirrer and the like. The heating is then conducted by heating the mixture with continuous or intermittent stirring, at reduced, atmospheric or elevated pressure, preferably atmospheric pressure, until the temperature reaches about 140° C. At this point, hydrogen sulfide gas begins to evolve, evidencing reaction between the PPA and sulfur. The heating is conducted at a temperature between 140°-300° C. as described above, until hydrogen sulfide evolution ceases. This usually requires about 1-2 hours and can be readily monitored by the well-known use of lead acetate paper. Preferably, the hydrogen sulfide is collected by an appropriate scrubbing system, purified, collected and made useful for other purposes. When H$_2$S gas evolution ceases, it is assumed that substantially all of the elemental sulfur initially present has reacted with the PPA, based on combustion data. Incomplete reaction between sulfur and PPA, as a result of, for example, lowering the temperature before hydrogen sulfide evolution completely ceases, leads to resulting poorer temperature susceptibility and ductility characteristics of the final asphalt cement.

In general, the temperature range operable for this step is about 140° to 300° C., and preferably about 200° to 225° C.

The amount of sulfur used in this step is about 1 to 15 weight percent, based on the total weight of PPA, which preferably in the heating step becomes substantially reacted with the PPA, such that homogeneous asphalt cements, which are dark brown to black, are produced after blending. A preferred amount is about 2 to 6 wt.% based on the total weight of the PPA.

The type of sulfur that is useful in the process is elemental sulfur and can be of any type of elemental sulfur including flowers of sulfur, alpha-sulfur, beta-sulfur and amorphous or liquid forms. Preferred is flowers of sulfur.

After the heating step has been performed, in any of the subject process embodiments described above, the softening point of the resulting sulfur-treated asphalt base is higher than that of the starting PPA and is generally in the range of about 65°-300° C., and preferably, 80°-140° C. as measured by ASTM D 36-76. The sulfur-treatment of the PPA should result in the asphalt base having a higher softening point in order to produce an asphalt cement having improved rheological characteristics.

The reaction between PPA and sulfur is thought to result in carbon-sulfur bond formation, e.g. sulfides and disulfides, forming high molecular weight sulfur-containing organic molecules, which have not yet been definitely characterized. It is believed that the viscosity of the resulting asphalt cement composition is increased by the presence of these higher molecular weight organic molecules, but it is not known why these materials also exert a positive effect on the temperature susceptibility and ductility characteristics of the resulting asphalt cement.

The second step of this embodiment of the process comprises blending the sulfur-treated asphalt base with 5-60 wt.% based on the total weight of said asphalt, of liquid petroleum fraction, having an atmospheric equivalent boiling range of about 370°-500° C., and preferably, 395° to 475° C. Representative examples of operable liquid petroleum fractions are vacuum gas oil, extract oil, catalytic cycle stock, and the like. Preferred is extract oil for economy and ease of blending. The blending or "fluxing" step is accomplished by use of conventional mixing or blending apparatus and is preferably conducted at a temperature of about 100° C. or above and particularly preferred about 125°-150° C., to insure production of a uniform product. Lower temperatures in the blending require extended time cycles for obtaining uniform compositions. Use of higher boiling petroleum fractions does not lead to asphalt cement with improved properties. The use of lower boiling fractions presents volatility problems.

Another embodiment of the subject process is heating a mixture consisting essentially of PPA, sulfur and total amount of liquid petroleum fraction to be used, i.e., 5-60 wt.% based on the total weight of the PPA. The mixture is heated at 140° to 300° C. until the evolution of hydrogen sulfide ceases. Any losses of petroleum fraction occurring during the heating can be adjusted for following the heating. Details of the procedure and apparatus are the same as described above.

A further embodiment of the subject process is heating a mixture consisting essentially of PPA, sulfur and a partial amount of the liquid petroleum fraction to be used and blending the resulting mixture with the remainder of the petroleum fraction as described above for the "fluxing" step.

Preferred embodiment of the process is heating a mixture consisting essentially of PPA and sulfur in a separate step then blending with the total amount of liquid petroleum fraction to be used.

The liquid petroleum fraction may be used "as is" or may be "sulfur-treated", and by this expression is meant, heating said liquid petroleum fraction with about 1-10 wt.%, based on said fraction, with elemental sulfur at an elevated temperature, until hydrogen sulfide is no longer evolved. Usually with most liquid petroleum fractions, this requires a temperature of about 150° C. or higher. Preferred is a liquid petroleum fraction which has been heated with about 2-6 wt.% sulfur until hydrogen sulfide evolution has ceased.

The total amount of liquid petroleum fraction to be used is about 5-60 weight percent, based on the total weight of said asphalt base, and preferably about 10-40 weight percent.

The amount of sulfur-treated asphalt base and petroleum fraction to be used in the composition depends upon the desired grade, the viscosity and penetration level, the softening point of the asphalt base, which in turn depends upon the percent sulfur used in the heat treatment and also the nature of the residuum from which the PPA is derived. The subject process is intended to encompass the scope of all of the stated variables which in combination will result in an asphalt cement of ASTM viscosity grade AC-2½, AC-5, AC-10, AC-20 and AC-40, and meeting the specifications of ASTM D 3381-76 or AASHTO M 226-73, and having a higher viscosity at 60° C., in the overall range from 200-5000 poises, as measured by the procedure of ASTM STP 532 (1973), interpolated at a penetration level of 90 decimillimeters at 25° C., than a comparative non-sulfur-treated composition, derived from the same propane-precipitated asphalt, whose softening point has not been increased.

Particularly preferred embodiment of the subject process is where the asphalt cement composition being of an ASTM viscosity grade, also meets the requirements of ASTM D 3381-76, Table 2, or AASHTO M 226-73, Table II.

By this last limitation, "whose softening point has not been increased," is meant that by subjecting the same PPA residue having the same softening point, to the same invention process steps, except for the sulfur-heating step, will result in a comparative material having a lower interpolated viscosity, as measured by ASTM STP 532 (1973) than a sample prepared by the invention process. The compositions of this invention exhibit improved viscosity properties (60° C.), at a penetration (25° C.) of 90, as compared to comparative samples when: (a) the PPA is not sulfur-treated, but fluxed with untreated or sulfur-treated extract oil; (b) the PPA is airblown, not sulfur-treated and fluxed with untreated extract oil; (c) the residuum is a straight run derived from a light Arabian crude; and (d) the residuum is a straight run, but air-blown, and derived from an Arabian Light.

Selection of variables, i.e. wt.% sulfur, reaction temperature, amount of liquid petroleum fraction to be added in order to achieve a desired grade meeting specifications, will be obvious to one skilled in the art from the disclosure without an undue amount of experimentation. For example, if an AC-20 grade is desired, a PPA derived from Arabian Light, is heated with about 6 wt.% sulfur, at about 200° C., and the resulting asphalt base is blended with about 25 wt.% of extract oil. This will yield an asphalt cement having a minimum penetration @ 25° C. of 60 and being within the viscosity range of about 1600-2400 poises at 60° C. If the viscosity is slightly out of this range, only a slight adjustment in the amount of extract oil must be made to meet the viscosity range.

The same asphalt base, meeting one grade, can be utilized to prepare other grades by suitable adjustment in the amount of extract oil for blending. Thus, if an AC-10 grade is desired, then a larger amount of extract oil should be employed with the same asphalt base described above. Similarly, larger amounts of extract oil will be utilized for meeting grades AC-2½ and AC-5, and a smaller amount will be utilized to meet grade AC-40.

The procedure described in ASTM STP 532 (1973) can be utilized to determine how much extract oil should be added to a prepared asphalt base in order to meet the grade specification. Several samples of differing viscosity can be prepared. Measurements of the viscosity (60° C.) and penetration (25° C.) are taken and a log-log plot is then prepared. From the plot, the amount of extract oil needed to be added to an asphalt base to meet specifications, can be determined. These and other modifications of the process in order to meet grade and specification will become obvious to one skilled in the art from a reading of this disclosure.

The asphalt cement composition produced by the process of this invention also exhibits a higher (a fraction being closer to one) penetration ratio (15°/25° C.) than said comparative non-sulfur treated composition derived from the same propane-precipitated asphalt. By the term, "penetration ratio (15°/25° C.)" or simply "penetration ratio", as used herein, is meant the ratio of the penetration values obtained at 15° C. and 25° C., respectively, according to ASTM D 5-65. It is known that the higher this ratio, the less the temperature susceptibility to changes in penetration value, and the better the asphalt cement with respect to meeting specifications within a particular grade. In general, the "penetration ratio" for sulfur-treated asphalt cement of this invention is usually about 0.290 and above and generally higher than that of comparative examples.

The asphalt cement composition produced by the instant invention process also generally exhibits improved ductility characteristics over comparative non-sulfur treated compositions. The test is performed according to ASTM D 113-79, and the results are interpolated to the same penetration values of about 87-88 decimillimeters at 25° C. As is seen in Table III, the ductility of the subject compositions is in general higher compared to the above-described non-sulfur treated compositions. In general, the subject compositions will exhibit higher penetration ratios and ductilities in combination, than comparative examples.

Also, a subject of the instant invention is the asphalt cement composition, produced by the above-described process, being of ASTM viscosity grades AC-2½, AC-5, AC-10, AC-20 and AC-40, and meeting the requirements of ASTM D 3381-76 (particularly Table 2) or AASHTO M 226-73, (particularly Table II).

The scope of the subject compositions covered is the same as the scope of the compositions produced by the subject process with respect to the asphalt cement. Details of the properties and manufacture of the composition are described above and need not be reiterated.

A further embodiment of the subject composition of this invention is a road paving mixture, i.e. asphaltic concrete, further comprising mineral aggregate, such as, inorganic particulate aggregate. Representative examples are stone, sand and/or mineral filler.

The mineral aggregate is usually present in about 90 to 96 weight percent of the asphaltic composition to achieve a material suitable for road paving applications.

Also a subject of this invention is a process for paving a road surface comprising the step of applying to said surface a paving grade quality asphalt cement composition prepared by the above-described subject process.

The preparation step can be conducted by heating the asphalt cement composition to a suitable temperature of about 150° C., for good flow properties and then directly applying the hot asphaltic composition, as is, to the road surface by conventional techniques such as spraying, applying mineral aggregate and then rolling, or directly applying the resulting asphaltic concrete mixture to the road surface and rolling.

The scope of the asphalt composition covered in this process is the same as the scope of the subject compositions described hereinabove since the compositions must be of paving grade quality, selected from the group consisting of AC-2½, AC-5, AC-10, AC-20 and AC-40 and meeting the specifications of ASTM D 3381-76 (particularly Table 2) or AASHTO M 226-73 (particularly Table II).

The following examples are illustrative of the best mode of carrying out the invention as contemplated by us and should not be construed as being limitations on the scope or spirit of the instant invention.

Parts are by weight unless otherwise indicated. The propane-precipitated asphalt, PPA, in all cases was derived from the residuum of a Light Arabian Crude, having a gravity of about 34.4° API. The softening point of the PPA used was 64° C. The extract oil used, which was non-sulfur treated, had an equivalent atmospheric boiling range of 395° to 475° C., and a viscosity of about 9 centistokes at 98.9° C.

COMPARATIVE EXAMPLE 1

PPA, 83 wt.%, and extract oil 17 wt.%, were blended together at 135° C. in a conventional heating—mixing apparatus to yield an asphalt cement.

COMPARATIVE EXAMPLE 2

This sample was prepared by the same procedure described in Comparative Example 1 except that PPA, 85 wt.% and extract oil 15 wt.% were used.

COMPARATIVE EXAMPLE 3

This sample was prepared by the same procedure described in Comparative Example 1 except that PPA, 85.5 wt.% and extract oil, 14.5 wt.% were used.

COMPARATIVE EXAMPLE 4

PPA was treated by blowing air into the material from a standard air-jet at 260° C. for about 2 hours. The air-blown material, 73.5 wt.% having a softening point about 88° C., and extract oil, 26.5 wt.%, were blended together as described above.

COMPARATIVE EXAMPLE 5

This sample was prepared by the same procedure described in Comparative Example 4 except that air-blown PPA, 76.5 wt.%, was blended with extract oil, 23.5 wt.%.

COMPARATIVE EXAMPLE 6

PPA, 79.5 wt.%, and extract oil, 20.5%, which was treated with 4 wt.% sulfur at 200°-220° C. and having a viscosity of 40 centistokes @ 98.9° C. and a boiling point of 395° to 475° C., were blended together as described above.

COMPARATIVE EXAMPLE 7

PPA, 83 wt.%, and extract oil (prepared as described in Comparative Example 3 except used 2 wt.% sulfur), 17 wt.%, were blended together as described above.

COMPARATIVE EXAMPLE 8

This sample was prepared by distilling off volatile fractions, having atmospheric boiling points below 610° C., from an Arabian Light Crude. The resulting asphalt cement, "straight run from crude," was used, as is, and was not blended with extract oil.

COMPARATIVE EXAMPLE 9

This sample was prepared from a "straight run" residuum as produced in Comparative Example 8, but from one having a viscosity of 1000 centistokes at 98.9° C., and then air-blowing said material at 210° C. for 2 hours to an 85-100 penetration grade.

EXAMPLE 1

PPA, 83 wt.%, and extract oil, 17 wt.%, were blended together as described above. The mixture was then heated at 200° C. with 2 wt.% sulfur, based on the weight of the PPA, until hydrogen sulfide evolution ceased, as determined by lead acetate paper.

EXAMPLE 2

PPA, 80 wt.%, and extract oil, 20 wt.%, were blended together as described above. The mixture was then heated at 210° C. with 4 wt.% sulfur, based on the weight of the PPA, until hydrogen sulfide evolution ceased.

EXAMPLE 3

PPA, having a softening point of 64° C., was heated with 4 wt.% elemental sulfur in a stirrer-reactor type apparatus at about 210° for about 2 hours, until hydrogen sulfide gas evolution had ceased, as determined by lead acetate test paper. The resulting asphalt base material had a softening point of about 88° C. This material, 76.5 wt.%, was blended with 23.5 wt.% of the above-described extract oil.

EXAMPLE 4

PPA was treated by the procedure in Example 1, except that 6 wt.% elemental sulfur was employed. The softening point of the resulting material was about 99° C. This material, 70 wt.%, was blended with 30 wt.% extract oil.

EXAMPLE 5

PPA, was treated by the procedure in Example 2. This material, 72 wt.%, was blended with extract oil, 28 wt.%.

Properties of the different PPA bases prepared above are listed below in Table I with assigned symbols for convenience in identification. Table II below lists the weight percentages of constituents in each of the resulting asphalt cement compositions. Table III below lists the physical properties of each of the resulting asphalt cement compositions.

TABLE I

| | PPA Base Properties | | |
|---|---|---|---|
| PPA Base | Symbol | Softening Point (ASTM D 36-76) | Wt. % Sulfur |
| PPA, untreated | PPA | 64° C. | 0 |

TABLE I-continued

PPA Base Properties

| PPA Base | Symbol | Softening Point (ASTM D 36-76) | Wt. % Sulfur |
|---|---|---|---|
| Air Blown PPA[a] | A-PPA | 86° C. | 0 |
| PPA S-treated @ 205–220° C.[b] | S-4-PPA | 88° C. | 4 |
| PPA S-treated @ 205–220° C.[c] | S-6-PPA | 99° C. | 6 |

[a]Air blown by treating PPA with a stream of air at about 260° C. for 2 hours.
[b]Made by heating PPA with 4 wt. % sulfur at 205–220° C. for 2 hours.
[c]Made by same procedure as in (b) but used 6 wt. % sulfur.

TABLE II

ASPHALT CEMENT COMPOSITIONS

| Example | Crude Composition (wt. %, PPA type) | Extract Oil[a], wt. % | Sulfur wt. % |
|---|---|---|---|
| Comp. Ex. 1 | 83 PPA | 17 | 0 |
| Comp. Ex. 2 | 85 PPA | 15 | 0 |
| Comp. Ex. 3 | 85.5 PPA | 14.5 | 0 |
| Comp. Ex. 4 | 73.5 A-PPA | 26.5 | 0 |
| Comp. Ex. 5 | 76.5 A-PPA | 23.5 | 0 |
| Comp. Ex. 6 | 79.5 PPA | 20.5[b] | 4 |
| Comp. Ex. 7 | 83 PPA | 17[c] | 2 |
| Example 1 | 83 PPA | 17 | 2[e] |
| Example 2 | 80 PPA | 20 | 4[e] |
| Example 3 | 76.5 S-4-PPA | 23.5 | 4 |
| Example 4 | 70 S-6-PPA | 30 | 6 |
| Example 5 | 72 S-6-PPA | 28 | 6 |
| Comp. Ex. 8 | Straight run | —[d] | 0 |
| Comp. Ex. 9 | Semi-blown residue | —[d] | 0 |

[a]Extract oil, non-sulfur treated having viscosity of 9 centistokes poises and boiling point 395 to 450° C. at one atmosphere.
[b]Above extract oil treated with 4 wt. % sulfur at 205° C. and having resulting viscosity of 40 centistokes at 98.9° C.
[c]Same as (b) above but treated with 2 wt. % sulfur.
[d]Residue used as is, no extract oil added.
[e]Mixture of PPA/Extract oil treated with sulfur.

TABLE III

PROPERTIES OF ASPHALT CEMENT COMPOSITIONS

| Example | Pen @ 25° C.[a] | Pen @ 60° C.[b] | Vis. @ 60° C. Adj. to 90 PEN @ 25° C. | Pen @ 15° C. | Pen Ratio (15/25° C.) | Ductility[d] |
|---|---|---|---|---|---|---|
| Comp. Ex. 1 | 94 | 1196 | 1260 | 22 | 0.234 | 3 |
| Comp. Ex. 2 | 84 | 1429 | 1220 | 21 | 0.250 | 3 |
| Comp. Ex. 3 | 65 | —[e] | —[e] | —[e] | —[e] | —[e] |
| Comp. Ex. 4 | 88 | 1545 | 1500 | —[e] | —[e] | 9 |
| Comp. Ex. 5 | 88 | —[e] | —[e] | —[e] | —[e] | 9 |
| Comp. Ex. 6 | 87 | 1487 | 1400 | 25 | 0.287 | 0.5 |
| Comp. Ex. 7 | 87 | 1426 | 1333 | 23 | 0.264 | 12 |
| Example 1 | 97 | 1337 | 1490 | 28 | 0.289 | —[e] |
| Example 2 | 87 | —[e] | —[e] | 25 | 0.287 | 11 |
| Example 3 | 86 | —[e] | —[e] | 25 | 0.291 | 3 |
| Example 4 | 106 | 1575 | 2140 | 33 | 0.315 | 11 |
| Example 5 | 85 | 2025 | 1920 | 25 | 0.294 | 11 |
| Comp. Ex. 8 | 90 | —[e] | 1428 | 25 | 0.278 | 0.7 |
| Comp. Ex. 9 | 88 | —[e] | 1500 | 22 | 0.250 | 0.7 |

[a]ASTM D 5-73
[b]ASTM D 2171-66
[c]ASTM STP 532 (1973)
[d]ASTM D 113-79 @ 4° C., interpolated to an 87-88 penetration level (25° C.)
[e]Not Measured

What is claimed is:

1. A process for preparing an asphalt cement composition comprising the steps of:
   (a) heating a mixture consisting essentially of a propane-precipitated asphalt, derived from a residuum of a crude oil, having a gravity of above about 20° API, and 0–60 weight percent, based on the total weight of said asphalt, of a liquid petroleum fraction, having an atmospheric equivalent boiling range of about 370°–500° C., and about 1 to 15 wt.% elemental sulfur, based on the total weight of said asphalt, at a temperature in the range of about 140° to 300° C., until hydrogen sulfide evolution ceases, thereby resulting in a sulfur-treated asphalt base having an increased softening point, compared to that of said propane-precipitated asphalt, and being in the temperature range of about 65°–300° C. as measured by ASTM D 36-76; and
   (b) blending said sulfur-treated asphalt base with about 0–60 weight percent, based on the total weight of said asphalt base, of said liquid petroleum fraction, such that the total amount of said petroleum fraction present is about 5–60 weight percent of said asphalt base, thereby producing an asphalt cement composition, being of ASTM viscosity grade AC-2½, AC-5, AC-10, AC-20 or AC-40 and meeting the requirements of ASTM D 3381-76 or AASHTO M 226-73, and exhibiting a higher viscosity at 60° C. (ASTM D 2171-66), as measured by the procedure of ASTM STP 532 (1973), in which said viscosity is interpolated at a penetration level of 90 decimillimeters at 25° C., than a comparative non-sulfur treated composition, derived from the same propane-precipitated asphalt whose softening point has not been increased.

2. The process of claim 1 wherein said crude oil has a gravity of about 30°–40° API.

3. The process of claim 1 wherein said propane-precipitated asphalt is treated with a stream of air at an elevated temperature, prior to heating with sulfur in step (a).

4. The process of claim 1 wherein said sulfur in step (a) present in about 2 to 6 wt.%, based on the total weight of said asphalt.

5. The process of claim 1 wherein said temperature of heating in step (a) is in the range of about 200° to 225° C.

6. The process of claim 1 wherein said sulfur-treated asphalt base has a softening point of about 80° to 140° C., as measured by ASTM D 36-76.

7. The process of claim 1 wherein said sulfur-treated asphalt base is blended with a total of about 10 to 40 weight percent, based on total weight of said asphalt base, of said petroleum fraction.

8. The process of claim 1 wherein said petroleum fraction is an extract oil.

9. The process of claim 1 wherein said petroleum fraction is vacuum gas oil.

10. The process of claim 1 wherein said petroleum fraction is treated with 1–10 wt.% elemental sulfur at an elevated temperature.

11. The process of claim 1 wherein said asphalt cement composition further meets the requirements of ASTM D 3381-76, Table 2 or AASHTO M 226-73, Table II.

12. The process of claim 1 wherein the total amount of liquid petroleum fraction is introduced in step (a).

13. The process of claim 1 wherein the total amount of liquid petroleum fraction is introduced in step (b).

14. A process for preparing an asphalt cement composition comprising the steps of:
   (a) heating a mixture consisting essentially of a propane-precipitated asphalt derived from a residuum of a crude oil, having a gravity of about 30°–40° API, and about 1 to 15 wt.% elemental sulfur, based on the total weight of said asphalt, at a temperature in the range of about 140° of said asphalt, at a temperature in the range of about 140° to 300° C., until hydrogen sulfide evolution ceases, thereby resulting in a sulfur-treated asphalt base having an increased softening point, compared to that of said propane-precipitated asphalt, and being in the temperature range of about 65°-300° C. as measured by ASTM D 36-76; and (b) blending said sulfur-treated asphalt base with about 5-60 weight percent, based on the total weight of said asphalt base, of a liquid petroleum fraction, having an atmospheric equivalent boiling range of about 395°-475° C., thereby producing an asphalt cement composition being of ASTM viscosity grade AC-2½, AC-5, AC-10, AC-20 or AC-40 and meeting the requirements of ASTM D 3381-76 and AASHTO M 226-73, and exhibiting a higher viscosity at 60° C. (ASTM D 2171-66) as measured by the procedure of ASTM STP 532 (1973), in which said viscosity is interpolated at a penetration level of 90 decimillimeters at 25° C., than a comparative non-sulfur treated composition, derived from the same propane-precipitated asphalt, whose softening point has not been increased.

15. An asphalt cement composition prepared by the process of claim 1.

16. The asphalt cement composition of claim 15 further comprising mineral aggregate.

17. A process for paving a road surface comprising the step of applying to said surface an cement composition prepared by the process of claim 1.

* * * * *